(12) United States Patent
Fogwill et al.

(10) Patent No.: US 10,705,060 B2
(45) Date of Patent: Jul. 7, 2020

(54) SPATIAL TEMPERATURE GRADIENTS IN LIQUID CHROMATOGRAPHY

(71) Applicant: Waters Technologies Corporation, Milford, MA (US)

(72) Inventors: Michael O. Fogwill, South Grafton, MA (US); Joseph D. Michienzi, Plainville, MA (US); Martin Gilar, Franklin, MA (US); Abhijit Tarafder, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 218 days.

(21) Appl. No.: 15/553,268

(22) PCT Filed: Feb. 25, 2016

(86) PCT No.: PCT/US2016/019471
§ 371 (c)(1),
(2) Date: Aug. 24, 2017

(87) PCT Pub. No.: WO2016/138208
PCT Pub. Date: Sep. 1, 2016

(65) Prior Publication Data
US 2018/0238838 A1      Aug. 23, 2018

Related U.S. Application Data

(60) Provisional application No. 62/126,070, filed on Feb. 27, 2015.

(51) Int. Cl.
*G01N 30/30* (2006.01)
*G01N 30/34* (2006.01)
(Continued)

(52) U.S. Cl.
CPC .............. *G01N 30/30* (2013.01); *G01N 30/34* (2013.01); *G01N 30/8637* (2013.01);
(Continued)

(58) Field of Classification Search
CPC .. G01N 2030/347; G01N 30/16; G01N 30/34; G01N 2030/027; G01N 2030/3015;
(Continued)

(56) References Cited

U.S. PATENT DOCUMENTS

| 4,484,061 A | 11/1984 | Zelinka et al. |
| 5,215,556 A | 6/1993 | Hiller et al. |

(Continued)

FOREIGN PATENT DOCUMENTS

| JP | 5059744 B2 | 10/2012 |
| WO | 2010/138678 A1 | 12/2010 |

(Continued)

OTHER PUBLICATIONS

Extended European Search Report relarting to corresponding Application No. EP 16756326, dated Oct. 19, 2018.
(Continued)

*Primary Examiner* — Randy W Gibson
*Assistant Examiner* — Gedeon M Kidanu
(74) *Attorney, Agent, or Firm* — Womble Bond Dickinson (US) LLP; Deborah M. Vernon; Heath T. Misley

(57) ABSTRACT

Methods for focusing analyte peaks in liquid chromatography using a spatial temperature gradient are provided. Also provided are methods for focusing analyte peaks and improving resolution using a trap column upstream of a separation column. Further, methods are provided in which the trap column placed upstream of the separation column is packed with a temperature-sensitive polymer/copolymer, and a spatial temperature gradient is applied along the trap column for obtaining improved retentivity by trap column
(Continued)

stationary phase, and overall improved resolution of analyte peaks.

20 Claims, 8 Drawing Sheets

(51) Int. Cl.
    *G01N 30/86*     (2006.01)
    *B01D 15/16*     (2006.01)
    *G01N 30/46*     (2006.01)
    *G01N 30/02*     (2006.01)

(52) U.S. Cl.
    CPC .......... *B01D 15/161* (2013.01); *G01N 30/461* (2013.01); *G01N 2030/027* (2013.01); *G01N 2030/3015* (2013.01); *G01N 2030/3076* (2013.01)

(58) Field of Classification Search
    CPC ........... G01N 2030/3076; G01N 30/30; G01N 30/461; G01N 30/8637
    See application file for complete search history.

(56) References Cited

U.S. PATENT DOCUMENTS

| | | | |
|---|---|---|---|
| 7,641,780 B2 | 1/2010 | Lee et al. | |
| 8,226,825 B2* | 7/2012 | Ross | G01N 30/30 210/143 |
| 8,779,333 B2 | 7/2014 | Collins et al. | |
| 2005/0161335 A1* | 7/2005 | Liu | G01N 27/44791 204/601 |
| 2006/0093718 A1* | 5/2006 | Jurkovich | A23N 17/005 426/524 |
| 2007/0144968 A1* | 6/2007 | Fazioni | B01D 15/3833 210/635 |
| 2007/0181702 A1* | 8/2007 | Ziegler | G01N 30/30 237/19 |
| 2009/0320560 A1* | 12/2009 | Ross | G01N 30/30 73/23.39 |
| 2010/0176043 A1* | 7/2010 | Wheat | B01D 15/166 210/198.2 |

FOREIGN PATENT DOCUMENTS

| | | | | |
|---|---|---|---|---|
| WO | 2015/020963 A1 | 2/2015 | | |
| WO | WO-2015020963 A1 * | 2/2015 | ........ | B01L 3/502761 |

OTHER PUBLICATIONS

Müller, et al., "Integrated system for tempature-controlled fast protein liquid chromatography comprising improved copolymer modified beaded agarose adsorbents and a tavelling cooling zone reactor arrangement," Journal of Chromatography A, 1285:97-109 (2013).

Berezkin, V.G., et al., "Tempature gradients in gas chromatography," Journal of Chromatography A, 371:21-44 (1986).

International Search Report and Written Opinion for International application No. PCT/US16/19471, issued on Apr. 18, 2016 and dated Jul. 12, 2016.

* cited by examiner

SPATIAL TEMPERATURE GRADIENTS IN LIQUID CHROMATOGRAPHY

CROSS-REFERENCE TO RELATED APPLICATIONS

This application is a 35 U.S.C. § 371 national stage filing of International Application No. PCT/US2016/019471, filed Feb. 25, 2016, which claims priority to U.S. Provisional Application No. 62/126,070 filed Feb. 27, 2015, each of which is incorporated herein by reference in its entirety.

FIELD OF INVENTION

The present disclosure relates to methods for increasing analyte resolution and focusing analyte peaks in liquid chromatography.

BACKGROUND

In conventional chromatography, separation between analytes is achieved due to migration of the analytes through a chromatography column at different speeds. The difference in speed is a result of differences among the analytes with regard to their rates of adsorption to and desorption from the stationary phase of the column. A problem encountered with conventional chromatography is that the width of an analyte band increases as the analyte migrates along the column, leading to elution of the analyte in a diluted form. Elution in a concentrated form (as a narrow peak) requires the sample containing the analyte to be injected in a small volume, i.e. the sample should be concentrated. Frequently, a concentrated sample is not available, and an additional step of concentrating the sample is needed to prevent elution in a diluted form. In addition, an analyte peak is often distorted in shape due to factors such as dead volume, unwanted analyte-surface interactions, and injection errors.

Focusing of an analyte band to yield narrow analyte peaks has been achieved in a form of gas chromatography known as thermal gradient gas chromatography (TGGC) in which a spatial temperature gradient is established along the column axis to achieve focusing. In a typical TGGC, temperature decreases from the column inlet to the column outlet causing the front of the analyte peak to experience a lower temperature, and therefore, migrate at a lower speed compared to the rear of the peak, thereby resulting in a focusing effect. In contrast, in conventional gas chromatography, i.e., in the absence of a spatial thermal gradient, analyte bands continue to gain in width with increase in migration distance.

Spatial temperature gradient has been suggested to also result in superior resolution (Rubey, W. A., J. High Res. Chromatogr. 1991, Vol. 14, p 542) compared to conventional gas chromatography. However, theoretical studies suggest that under ideal chromatographic conditions, that might not be the case (Ohline, R. W. and DeFord D. D., Anal. Chem. 1963, Vol. 35, pp 227-234). Regardless, TGGC is reported to be effective for improving loss of resolution or speed of analysis resulting from non-ideal chromatographic conditions such as poor sample introduction, column overloading, adsorption, and dead volume (Blumberg, L. M., Anal. Chem. 1992, Vol. 64, p. 2459; Blumberg, L. M., J. Chromatogr. Sci. 1997, Vo. 35, p. 451).

In liquid chromatography temperature manipulation has been used largely to heat or cool the entire column to a desired temperature for achieving improvement in chromatographic separation. For example, higher temperatures, which decreases viscosity of the mobile phase, leads to lower back pressures, making it possible to apply higher flow rates for achieving reduction in analysis time.

Temperature manipulation has also been used in conjunction with stationary phase conjugated to a temperature-sensitive polymer or copolymer. A stationary phase modified with a temperature sensitive polymer/copolymer binds analytes in a temperature dependent manner. For example, Muller et al. (J. Chromatogr. A, 1285 (2013) 97-109) describes a system for temperature-controlled fast protein liquid chromatography using a temperature-sensitive copolymer conjugated to the stationary phase in which an analyte is adsorbed at 42° C. and desorbed using a traveling cooling zone (at 22° C.) to obtain concentrated elution peaks.

Temperature manipulation in the form of a spatial temperature gradients may also, in theory, be used in liquid chromatography for achieving focused analyte peaks. However, in general, while the column temperature in liquid chromatography affects analyte retention in a manner similar to that observed in gas chromatography, the magnitude of the effect is much reduced, limiting the applicability of this technique to liquid or $CO_2$-based chromatography. U.S. Pat. No. 8,226,825 describes a liquid chromatography method involving a spatial temperature gradient to achieve equilibrium gradient focusing. The gradient is applied in the form a temperature wave that moves repeatedly through a system of two or more chromatography columns (i.e., a non-fixed dynamic gradient). Analytes accumulate at select locations on the moving temperature wave and analyte peaks become narrower and more intense as the temperature wave is circulated about the system.

SUMMARY

Exemplary embodiments of the present technology are directed to methods for focusing analyte peaks and improving resolution in liquid chromatography by applying a spatially fixed temperature gradient along a column length. In certain embodiments, the temperature gradient is maintained throughout the separation. Methods disclosed herein are also directed to liquid chromatography separations for improved resolution of analyte peaks using an apparatus comprising a trap column upstream of a separation column, with a spatial temperature gradient applied along the length of each of the trap column and the separation column. Analytes adsorbed in the trap column are desorbed by heating/cooling the trap column isothermally across the length of the trap column while flowing a solvent. The desorbed analytes enter the separation column, are adsorbed to the stationary phase in the separation column, and are eluted by a mobile phase. In an exemplary embodiment, the trap column is packed with a temperature-sensitive polymer or a copolymer which undergoes change in retentivity with change in temperature.

In accordance with an aspect of the present disclosure, a method for focusing analyte peaks corresponding to a plurality of analytes present in a sample is provided. The method includes providing a liquid chromatography apparatus including a column packed with a stationary phase along a column length between a column inlet and a column outlet. The method further includes applying a spatial temperature gradient along at least a portion of the column length, such that the temperature gradient is spatially fixed. The difference between a highest and a lowest temperature in the applied spatial temperature gradient is represented by ΔT, and different regions of the stationary phase along the column length, when contacted with an analyte, can have different analyte-stationary phase affinity, and the affinity can depend on temperatures in the different regions. An analyte can have a greater stationary phase affinity at a colder temperature. The method further includes introducing the sample into the column in a first mobile phase, such that under influence of the applied spatial temperature gradient and the first mobile phase, the plurality of analytes adsorb at the different regions in accordance with their affinities for the stationary phase at the different regions, and a condition is created in the column such that a head of a peak corresponding to an analyte among the plurality of analytes is retained more strongly than a tail of the peak. The method further includes flowing the first mobile phase or a second mobile phase to elute the plurality of analytes, thereby repeatedly focusing the peaks corresponding to the plurality of analytes compared to chromatography absent the spatial temperature gradient.

Embodiments of the above method can include one or more of the following features. In one embodiment, the spatial temperature gradient is temporally fixed. In some embodiments, the highest and the lowest temperature of the spatial temperature gradient are raised or lowered during chromatography without substantially changing the $\Delta T$ (e.g. $\pm 0.5°$ C.; $\pm 0.05°$ C., or $\pm 0.005°$ C.). In one embodiment, the first and the second mobile phase are the same. In another embodiment, the first and the second mobile phases are different. In one embodiment the first and/or the second mobile phase includes at least two solvents mixed in a fixed ratio. In another embodiment, the first and/or the second mobile phase includes at least two solvents mixed in a ratio that changes according to a gradient. For example, the first mobile phase used for introducing sample to the column is made of a single solvent (e.g. water), and the second mobile phase used for eluting the plurality of analytes includes different solvent or a mixture of solvents. Alternatively, the first mobile phase may include a mixture of solvents. The mixture of solvents present in the first and/or the second mobile phase may include at least two solvents mixed in a ratio that changes during the chromatography according to a gradient. Alternatively, the mixture of solvents may have a fixed composition. In one embodiment, in the step to elute the plurality of analytes, flow rate of the first or the second mobile phase is higher relative to the flow rate used for introducing the plurality of analytes into the column.

In another aspect, the present disclosure features a method for focusing analyte peaks corresponding to a plurality of analytes present in a sample in a liquid chromatographic separation. The method includes providing a liquid chromatography apparatus including a column packed with a stationary phase along a column length between a column inlet and a column outlet. The method further includes applying a first spatial temperature gradient along at least a portion of the column length, such that the temperature gradient is spatially fixed. In the first spatial temperature gradient, the difference between a highest and a lowest temperature is represented by $\Delta T$. Further, direction of the applied first spatial temperature gradient is opposite to direction of a second spatial temperature gradient between the column inlet and the column outlet resulting from friction between the stationary phase and a mobile phase when flowing through the column. Different regions along the column length, when contacted with an analyte, can bind reversibly to the analyte with affinities that depend on temperatures in the different regions because the analytes can have different analyte-stationary phase affinity, and the affinity can depend on temperatures in the different regions. An analyte can have a greater stationary phase affinity at a colder temperature. The method further includes introducing the sample into the column in a first mobile phase, such that under influence of the first spatial temperature gradient and the first mobile phase, the plurality of analytes adsorb at the different regions in accordance with their affinities for the stationary phase at the different regions. The method further includes flowing a second mobile phase to elute the plurality of analytes, thereby repeatedly focusing the peaks corresponding to the plurality of analytes compared to chromatography absent the first spatial temperature gradient.

In different embodiments, the above method can include one or more of the following features. In one embodiment the liquid chromatographic separation is a reverse phase separation. In another embodiment, the liquid chromatographic separation is a normal phase separation. In one embodiment, the first spatial temperature gradient is temporally fixed. In another embodiment, the highest temperature and the lowest temperature of the first spatial temperature gradient are raised during chromatography without substantially changing the $\Delta T$ (e.g. $\pm 0.5°$ C.; $\pm 0.05°$ C., or $\pm 0.005°$ C.). In one embodiment, the first mobile phase and the second mobile phase are the same. In certain embodiments, the first mobile phase and the second mobile phase are different. In one embodiment the first and/or the second mobile phase includes at least two solvents mixed in a fixed ratio. For example, the first mobile phase used for introducing sample to the column is made of a single solvent (e.g. water), and the second mobile phase used for eluting the plurality of analytes includes a different solvent or a mixture of solvents. Alternatively, the first mobile phase may include a mixture of solvents. In another embodiment, the first and/or the second mobile phase includes at least two solvents mixed in a ratio that changes according to a gradient. In one embodiment, in the step to elute the plurality of analytes, flow rate of the first or the second mobile phase is higher relative to the flow rate used for introducing the plurality of analytes into the column.

In yet another aspect, the present disclosure provides a method of improving resolution of analyte peaks corresponding to a plurality of analytes present in a sample. The method includes providing a liquid chromatography apparatus including a trap column, and a separation column downstream from the trap column. The trap column is packed with a first stationary phase along a trap length between a trap inlet and a trap outlet, and the separation column is packed with a second stationary phase along a column length between a column inlet and a column outlet. The method further includes applying a first spatial temperature gradient along at least a portion of the trap length, and applying a second spatial temperature gradient along at least a portion of the column length, such that each of the first and the second temperature gradients is spatially fixed. The difference between a highest and a lowest temperature in the first temperature gradient is represented by $\Delta T_1$, and difference between a highest and a lowest temperature in the second temperature gradient is represented by $\Delta T_2$. Further, different regions of the first stationary phase along the trap length and different regions of the second stationary phase along the column length, when contacted with an analyte, can bind reversibly to the analyte with affinities that depend on temperatures in the different regions of the trap length and temperatures in the different regions of the column length, respectively, because the analytes can have different analyte-stationary phase affinity, and the affinity can depend on temperatures in the different regions. The method further includes introducing the sample into the trap column in a first mobile phase, such that under influence of the first spatial temperature gradient and the first mobile phase, the plurality of analytes adsorb at the different regions along the trap length in accordance with their affinities for the first stationary phase at the different regions; thereby resulting in greater separation among the plurality of analytes adsorbed along the trap length than achievable in the absence of the first spatial temperature gradient. The method further includes desorbing the plurality of analytes from the trap column by heating/cooling the first stationary phase isothermally across the trap length while continuing flowing the first mobile phase, or flowing a second mobile phase, thereby, introducing the desorbed plurality of analytes into the separation column. Under influence of the second temperature gradient and the first or the second mobile phase, the plurality of analytes adsorb at different regions along the column length in accordance with their affinities for the second stationary phase at the different regions. Also, a condition is created in the column such that a head of a peak corresponding to an analyte among the plurality of analytes is retained more strongly than a tail of the peak. Further, the method includes flowing or continuing flowing the second mobile phase to elute the plurality of analytes, thereby repeatedly focusing the peaks corresponding to the plurality of analytes compared to chromatography absent the first and the second temperature gradient.

The above method can include one or more of the following features. In one embodiment the desorbing of the plurality of analytes from the trap column comprise heating/cooling the first stationary phase isothermally across the trap length to a temperature sufficient to desorb the plurality of analytes. In another embodiment, in the desorbing step, flow rate of the first or the second mobile phase is higher relative to flow rate used for introducing the plurality of analytes into the trap column. In one embodiment, the first spatial temperature gradient and the second temperature gradient are temporally fixed. In one embodiment, only the first spatial temperature gradient is fixed. In one embodiment, only the second spatial temperature gradient is fixed. In another embodiment, the highest temperature and the lowest temperature of the second spatial temperature gradient are raised during chromatography without substantially changing the $\Delta T_2$. In one embodiment, the first mobile phase used for introducing the sample to the trap column or the separation column, and the second mobile phase used for introducing the desorbed analytes into the separation column or for eluting the plurality of analytes are the same. In some embodiments, the first mobile phase and the second mobile phase are different. For example, the first mobile phase is made of a single solvent (e.g. water), and the second mobile phase includes a different solvent or a mixture of solvents. Alternatively, the first mobile phase may include a mixture of solvents. The mixture of solvents present in the first and/or the second mobile phase may include at least two solvents mixed in a fixed ratio. Alternatively, the first and/or the second mobile phase comprises at least two solvents mixed in a ratio that changes according to a gradient.

According to another aspect, the present disclosure provides a method of improving resolution of analyte peaks corresponding to a plurality of analytes present in a sample using a stationary phase modified with a temperature-sensitive polymer/copolymer. The method includes providing a liquid chromatography apparatus including a trap column, and a separation column downstream from the trap column. The trap column is packed with a first stationary phase along a trap length between a trap inlet and a trap outlet, and the stationary phase is modified with a temperature-sensitive polymer or a temperature-sensitive copolymer. The separation column is packed with a second stationary phase along a column length between a column inlet and a column outlet. The method further includes applying a first spatial temperature gradient along at least a portion of the trap length. The first temperature gradient is spatially fixed. The difference between a highest and a lowest temperature in the first temperature gradient is represented by $\Delta T_1$, which is selected so as to allow a desired level of retentivity to be achieved by the first stationary phase relative to the secondary stationary phase. Further, different regions of the first stationary phase along the trap length, when contacted with an analyte, bind reversibly to the analyte with affinities that depend on temperatures in the different regions, because the analytes can have different analyte-stationary phase affinity, and the affinity can depend on temperatures in the different regions. The method further includes introducing the sample into the trap column in a first mobile phase, such that, under influence of the first spatial temperature gradient and the first mobile phase, the plurality of analytes adsorb at different regions along the trap length in accordance with their affinities for the first stationary phase at the different regions. This results in greater separation among the plurality of analytes adsorbed along the trap length than achievable in the absence of the first spatial temperature gradient. In addition, retentivity of the first stationary phase for the plurality of analytes is improved. The method further includes desorbing the plurality of analytes from the trap column by heating/cooling the first stationary phase isothermally across the trap length while continuing flowing the first mobile phase, or flowing a second mobile phase, thereby introducing the desorbed plurality of analytes into the separation column. Further, the method includes flowing or continuing flowing the second mobile phase to elute the plurality of analytes introduced into the separation column, thereby obtaining improved resolution of the peaks corresponding to the plurality of analytes compared to chromatography absent the temperature-sensitive polymer or a temperature-sensitive copolymer modified first stationary phase and the first spatial temperature gradient.

Embodiments of the above method can include one or more of the following features. In one embodiment, the method further includes applying a second spatial temperature gradient along at least a portion of the column length between a column inlet and a column outlet prior to introducing the sample into the trap column. The second temperature gradient is spatially fixed. The difference between a highest and a lowest temperature in the second spatial temperature gradient is represented by $\Delta T_2$. Further, different regions of the stationary phase_along the column length, when contacted with an analyte, bind reversibly to the analyte with affinities that depend on temperatures in the different regions, because the analytes can have different analyte-stationary phase affinity, and the affinity can depend on temperatures in the different regions. In addition, under influence of the second spatial temperature gradient and the second mobile phase, the plurality of analytes adsorb at different regions along the column length in accordance with their affinities for the second stationary phase at the different regions. Also, a condition is created in the column such that a head of a peak corresponding to an analyte among the plurality of analytes is retained more strongly than a tail of the peak. As a result, repeated focusing of the peaks corresponding to the plurality of analytes occurs.

Embodiments of the above method can include one or more of the following features. In one embodiment, the temperature-sensitive polymer or the temperature-sensitive copolymer is such that retentivity of the polymer or the copolymer changes with temperature. For example, the change in retentivity is due to a change in the hydrophobicity of the polymer due to a temperature change. In another embodiment, in the desorbing step, flow rate of the first mobile phase is higher relative to flow rate used for introducing the plurality of analytes into the trap column. In one embodiment, composition of the first mobile phase and the second mobile phase are the same. In another embodiment, the composition of the first mobile phase and the second mobile phase are different. For example, the first mobile phase is made of a single solvent (e.g. water), and the second mobile phase includes a different solvent or a mixture of solvents. In yet another embodiment, the first and/or the second mobile phase comprise at least two solvents mixed in a fixed ratio. In a further embodiment, the first and/or the second mobile phase comprises at least two solvents mixed in a ratio that changes according to a gradient. In some embodiments, the selected level of retentivity of the first stationary phase is equal to or lower than the retentivity of the second stationary phase.

Additional features of the above method can include any of the following, and can be combined with any other feature. In one embodiment, the temperature-responsive polymer is poly(N-isopropylacrylamide) (PNIPAAm). In one embodiment, the temperature-responsive copolymer is poly(N-isopropylacrylamide-co-N-tert-butylaxrylamide-co-acrylic acid) (pNIPAAm-co-tBAAm-co-AAC). In one embodiment, the second spatial temperature gradient is temporally fixed. In another embodiment, the highest and the lowest temperature of the second spatial temperature gradient are raised during chromatography without substantially changing the $\Delta T_2$.

The exemplary methods of the present disclosure provide several advantages. For example, improved resolution and focusing of analytes peaks is achieved by applying a spatial thermal gradient. The thermal gradient is spatially fixed. This is in contrast to methods described in prior art involving spatial temperature gradients that are dynamic and travel along the length of the chromatography column. Further, the use of a trap column upstream of a separation column, each having a spatially fixed temperature gradient applied to it, permits improved resolution as well as focusing of analytes peaks compared to chromatography performed using a trap column in conjunction with a separation column, without each having a temperature gradient applied to it.

BRIEF DESCRIPTION OF THE DRAWINGS

The foregoing and other features and advantages provided by the present disclosure will be more fully understood from the following description of exemplary embodiments when read together with the accompanying drawings, in which.

DETAILED DESCRIPTION

Methods for achieving improved resolution of analyte peaks using one or more spatial temperature gradients are described herein. Retention of an analyte in a chromatographic separation is dependent on the temperature of the chromatographic separation column. This dependence can be used to improve separation parameters of the chromatography. For example, in gas chromatography (GC), spatial thermal gradients have been used to achieve continuous refocusing of analyte peaks (Contreras, et al. J. Chromatogr. A., 2013, 1278, 160-165; Jain and Phillips, 1995, J. Chromatogr. Sci. 33 601-605). Such refocusing results in narrower and more concentrated elution peaks as compared to conventional temperature programmed GC in which the entire column is heated or cooled to a selected temperature. Further, spatial thermal gradients in GC are helpful in restoring losses in peak shape due to dead volume, injection errors, unwanted analyte-surface interactions, and column overload.

In general, increasing column temperature results in an increase of the enthalpy of the analyte subjected to chromatography. Increased analyte enthalpy results in partitioning of the analyte away from the stationary phase and into the mobile phase (i.e. decreased retention). In the case of liquid chromatography (LC) the mobile phase is a solvent or a mixture of solvents. Therefore, establishing a spatial thermal gradient on a LC column, for example, by maintaining the region near the column inlet at a warmer temperature compared to that near the column outlet may lead to the head of an analyte band being more highly retained than the tail of the same band. Similar to GC, this disparity in band retention may result in a continuous focusing effect as the band traverses the column yielding narrower and more concentrated elution peaks. However, for liquid chromatography, the disparity of band retention and the resulting focusing effect is smaller than that observed in gas chromatography. This smaller effect of the applied spatial temperature gradient is further compounded by temperature gradient resulting from heat generated due to friction between the mobile phase and the stationary phase.

Figure 1A:
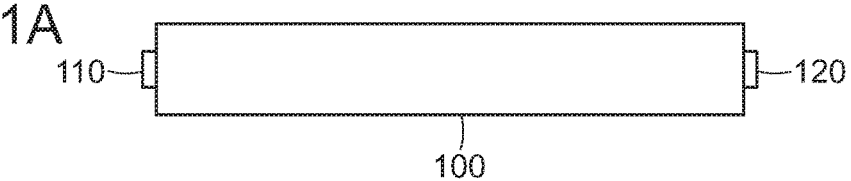
FIG. 1A is a schematic diagram of a liquid chromatography column with an inlet and an outlet.
Figure 1B:
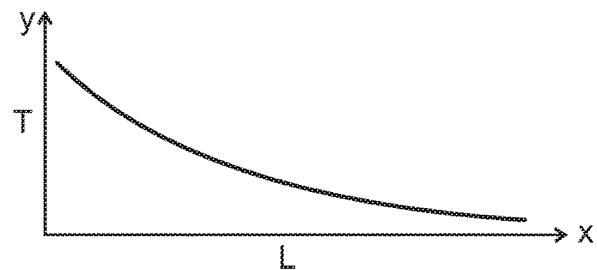
FIG. 1B and FIG. 1C are graphs showing exemplary spatial temperature gradients established along the length of the column with the temperature decreasing (FIG. 1B) or increasing (FIG. 1C), respectively, in the direction of the column inlet to the column outlet.
Figure 1C:
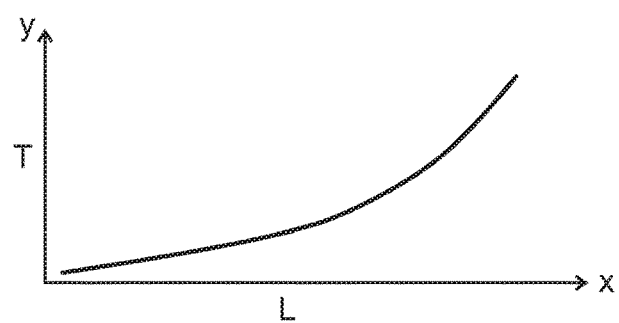
Figure 1D:
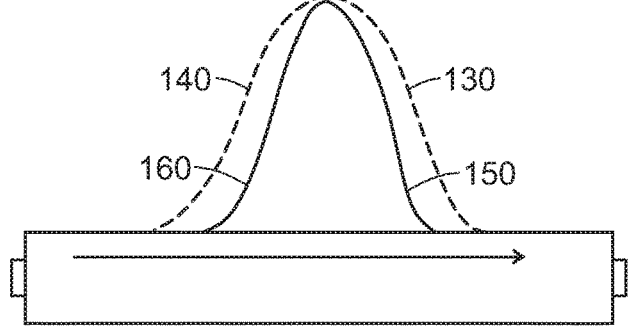
FIG. 1D is a schematic diagram showing a head of a peak experiencing stronger retention than the tail of the peak due to a temperature gradient applied along the column length.
Figure 1D:
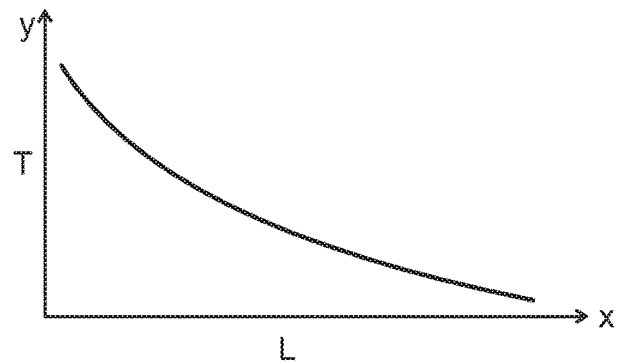

In the methods described herein, a spatial temperature gradient is established along the length of a chromatography column to obtain narrower and more concentrated elution peaks. FIG. 1A illustrates a liquid chromatography column (100) with an inlet (110) and an outlet (120). FIGS. 1B and 1C are schematic graphs showing exemplary spatial temperature gradients established along the length of the column with the temperature decreasing (FIG. 1B) or increasing (FIG. 1C), respectively, in the direction from the column inlet (110) to the column outlet (120). Distance (L) from the column inlet (110) is plotted along the X-axis. Temperature (T) of the column (100) at various distances from the column inlet (110) is plotted along the Y-axis. FIG. 1D shows an exemplary analyte peak in the presence (solid line), and in the absence (broken line) of an applied spatial temperature gradient. The head (150) and the tail (160) of the peak in the presence of the gradient, and the head (130) and the tail (140) of the corresponding peak in the absence of the gradient are as shown. The direction of flow of the analytes is shown by the arrow along the column length. In this example, the applied temperature gradient is such that the stationary phase near the column inlet is warmer than that near the column outlet. In the presence of the gradient, the head of the peak is more strongly retained (i.e. it lags) than the head of the peak in the absence of the gradient (150 lags behind 130), and the tail of the peak is less strongly retained (i.e. it leads) than the tail of the peak in the absence of the gradient (160 leads over 140). As a result, in the presence of the temperature gradient, the head (150) of the peak experiences stronger retention than the tail (160) of the peak, leading to a narrower peak relative to the peak width in the absence of the temperature gradient. That is, the area under the curve with the applied temperature gradient is less than the area under the curve illustrating a separation without an applied temperature gradient.

Methods herein may be used in both the "normal phase chromatography" and the "reverse phase chromatography" modes. In "normal phase chromatography" the stationary phase is polar or hydrophilic, the hydrophilic molecules present in the mobile phase adsorb to the column, and the hydrophobic molecules pass through the column. The hydrophilic molecules are eluted from the column by increasing the polarity of the solution in the mobile phase. The more polar the mobile phase, the greater its eluent strength (a solvent's ability to displace solute adsorbed to a stationary phase). Conversely, in "reverse phase chromatography" the stationary phase is nonpolar or hydrophobic, the hydrophobic molecules present in the mobile phase adsorb to the column, and the hydrophilic molecules pass through the column. The hydrophobic molecules are eluted from the column by decreasing the polarity of the solution in the mobile phase using organic solvents. The less polar the mobile phase, the greater its eluent strength.

It is noteworthy that the magnitude of dependence of analyte retention on temperature is lower in LC than in GC. Therefore, in order to increase the extent to which analyte retention is affected by temperature (in normal phase chromatography), a solvent with polarity that is strongly dependent on temperature, for example, water, may be used as the mobile phase. Polarity is directly proportional to dielectric constant and to eluent strength (or solvent strength). Since the dielectric constant of water decreases with increasing temperature, the resultant polarity and solvent strength accordingly decrease. Therefore, a spatial thermal gradient under which the stationary phase near the column outlet is warmer than that near the column inlet, solvent strength progressively decreases along the column length from the inlet to the outlet, and the solvent strength near the outlet is lower compared to that near the inlet. Since analytes are more strongly partitioned toward the stationary phase when the mobile phase solvent strength is lower, the front of an analyte band is more highly retained than the rear of the band when such spatial thermal gradient is established. The strong dependence of the polarity of water on temperature increases the extent to which analyte retention is affected by column temperature.

In situations where water is not the mobile phase of choice, a strong dependence between analyte retention and temperature may be maintained by using a thermally responsive stationary phase (where the polarity of the stationary phase can be changed with temperature). Thermally responsive stationary phases involving coupling of a temperature-sensitive polymer or a temperature-sensitive copolymer to a stationary support have been previously described (Kanazawa, et al. Anal. Chem. 68 (1996) 100; Ayano, et al. J. Chromatogr. A. 1119 (2006) 51; Muller, et al. J. Chromatogr. A. 1285 (2013) 97). Grafting such polymers/copolymers onto a stationary support (e.g. silica) provides a stationary phase which is more hydrophobic at higher temperatures and less so at lower temperatures.

Figure 3:
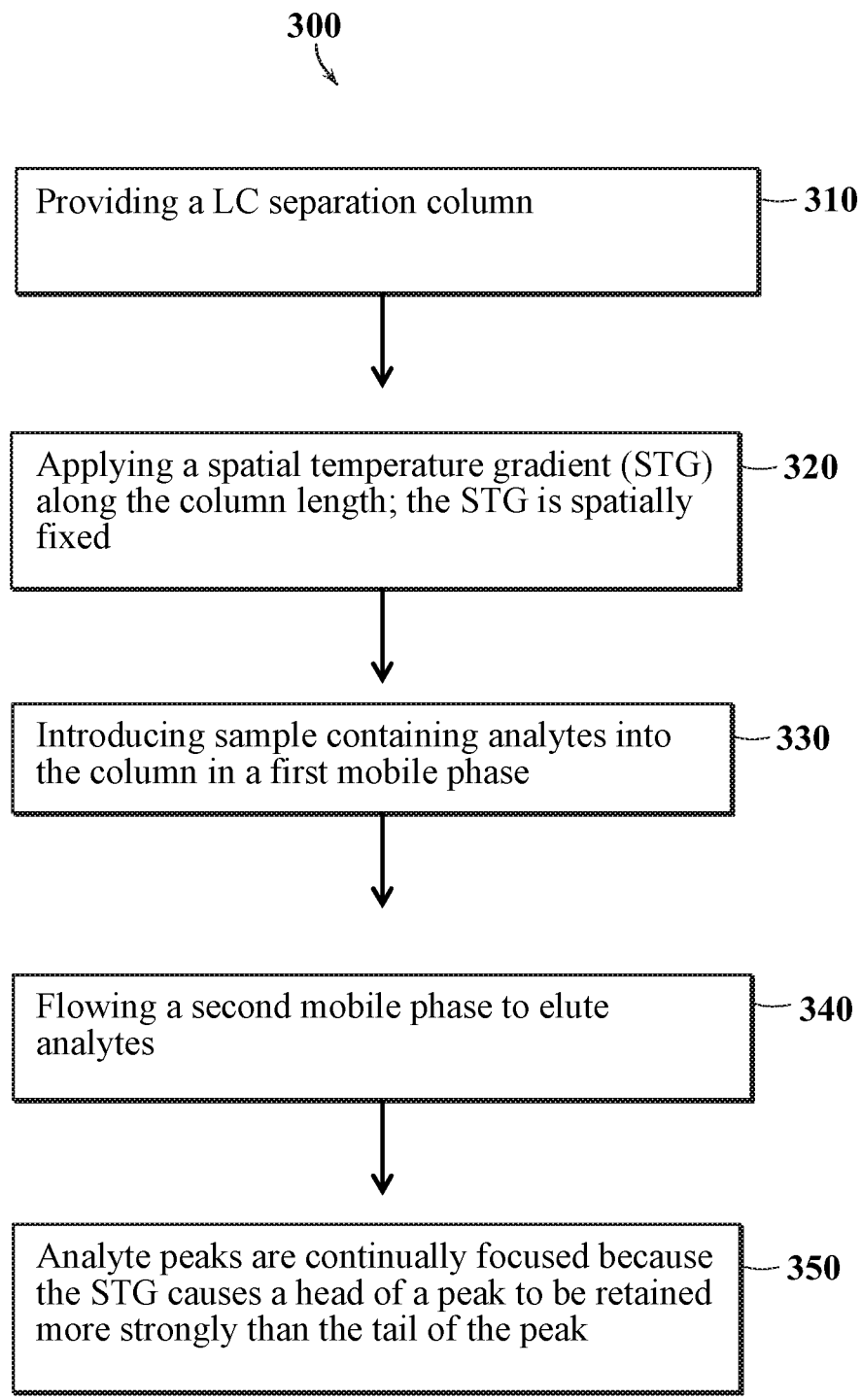
FIG. 3 is a schematic representation of a method for improving resolution in liquid chromatography by applying spatial temperature gradient along the length of a chromatography column.

Accordingly, in one embodiment, the present disclosure provides a liquid chromatography method (300; FIG. 3) for improving resolution of peaks corresponding to analytes present in a sample. The method includes applying a spatial temperature gradient along at least a portion of a column length between an inlet and an outlet of a column packed with a stationary phase (310). The applied temperature gradient is spatially fixed (320). Different regions of the stationary phase along the column length, when contacted with an analyte, bind the analyte with affinities that depend on the temperatures of the stationary phase in the different regions, because the analytes can have different analyte-stationary phase affinity, and the affinity can depend on temperatures in the different regions. Next, the sample is introduced into the column in a first mobile phase (320). Following introduction into the column, under influence of the applied spatial temperature gradient and the first mobile phase, the analytes adsorb at the different regions in accordance with their affinities for the stationary phase at the different regions. In addition, a condition is created in the column such that a head of a peak corresponding to an analyte among the plurality of analytes is retained more strongly than a tail of the peak. A second mobile phase is next flowed to elute the analytes (330). As the analytes migrate through the column toward the outlet, the disparity in band retention results in a continuous focusing effect (350), leading to narrower eluted peaks compared to chromatography carried out in the absence of the spatial temperature gradient.

In liquid chromatography, the flow of the mobile phase through the column stationary phase leads to frictional heating with the temperature increasing in the direction of the flow, thus setting up a temperature gradient along the column length. Thus an applied spatial temperature gradient may either be in alignment or in opposition to the temperature gradient due to frictional heating. Depending on whether the separation being carried out is a normal phase separation or a reverse phase separation, it may be advantageous to have the applied spatial temperature gradient in alignment with or in opposition to the temperature gradient due to frictional heating.

Figure 4:
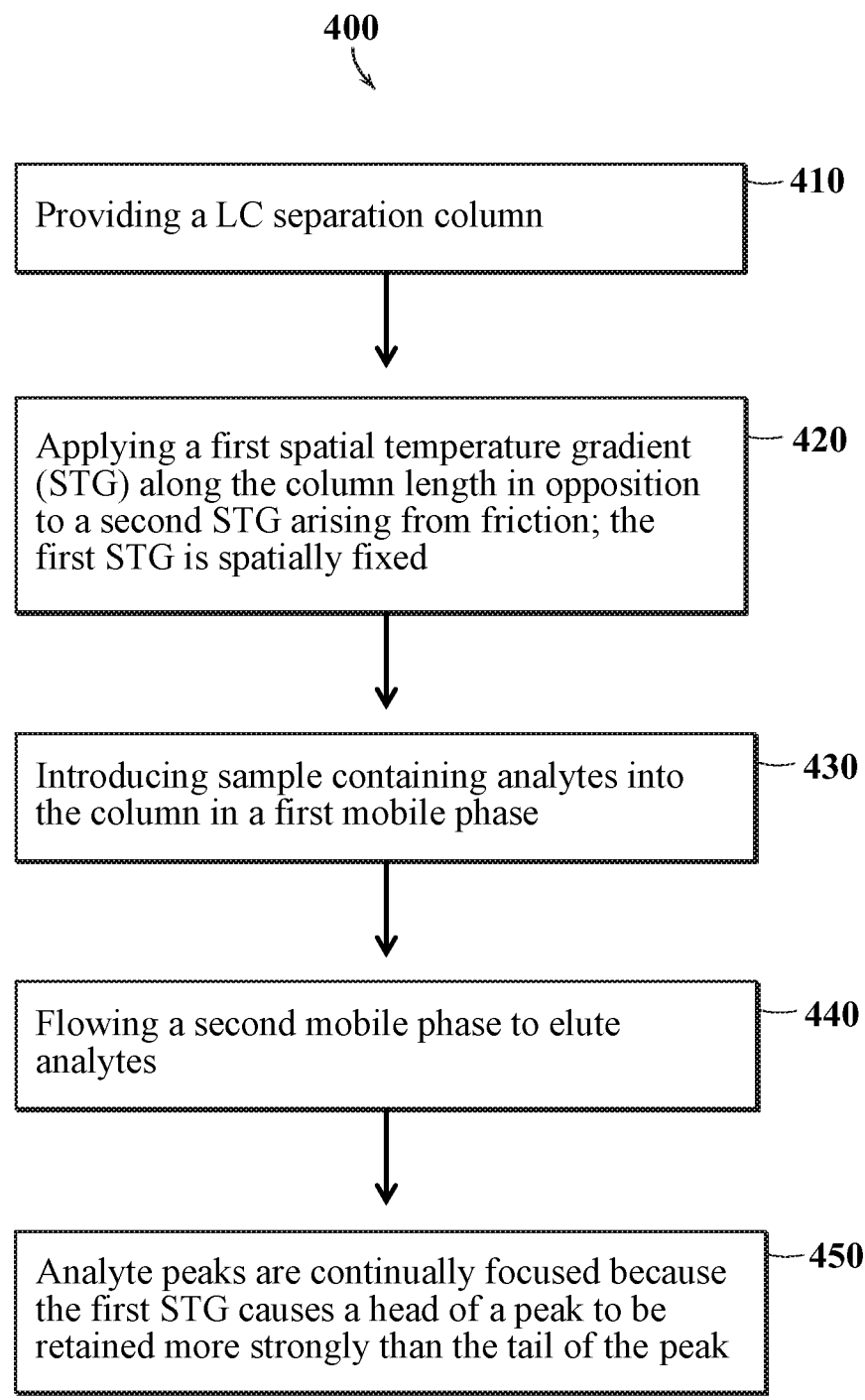
FIG. 4 is a schematic representation of a method for improving resolution in reverse phase liquid chromatography using a spatial temperature gradient applied in a direction opposite to the spatial temperature gradient arising from frictional heating between mobile and stationary phases.

Accordingly, in one embodiment, the present disclosure provides a method (400; FIG. 4) for improving resolution in a reverse phase liquid chromatographic separation by employing an applied spatial temperature gradient in opposition to the temperature gradient due to frictional heating. The method includes applying a spatial temperature gradient (first spatial temperature gradient) along at least a portion of the length between an inlet and an outlet of a chromatography column (410, 420). The first temperature gradient is spatially fixed, and the difference between a highest and a lowest temperature in the gradient is represented by ΔT. Further, the direction of the applied first spatial temperature gradient is opposite to the direction of a second spatial temperature gradient between the column inlet and the column outlet resulting from friction between the stationary phase and a mobile phase when flowing through the column (420). The applied (first) spatial thermal gradient dominates over the second spatial temperature gradient. In other words, the applied first spatial temperature gradient is such that the temperature of the stationary phase near the inlet is warmer than that near the outlet. In addition, different regions of the stationary phase along the column length, when contacted with an analyte, bind the analyte with affinities that depend on the temperatures of the stationary phase in the different regions, because the analytes can have different analyte-stationary phase affinity, and the affinity can depend on temperatures in the different regions. Next, a sample is introduced into the column in a mobile phase (first mobile phase; step 430). Under influence of the first spatial temperature gradient and the first mobile phase, the analytes adsorb at the different regions in accordance with their affinities for the stationary phase at the different regions. Next, a second mobile phase is flowed to elute the analytes (440). As the analytes traverse through the column toward the outlet, a head of a peak is retained more strongly than the tail of the peak. In some cases, the head of the peak is more strongly retained than the tail due to the first spatial temperature gradient. In other cases the difference in retention is due to the combined effect of the first and the second spatial temperature gradients. This difference in retention between the head and the tail of a peak results in a continuous focusing effect as the analytes migrate toward the column outlet (450), leading to eluted analyte peaks that are narrower compared to chromatography carried out without the applied first spatial temperature gradient.

Figure 5:
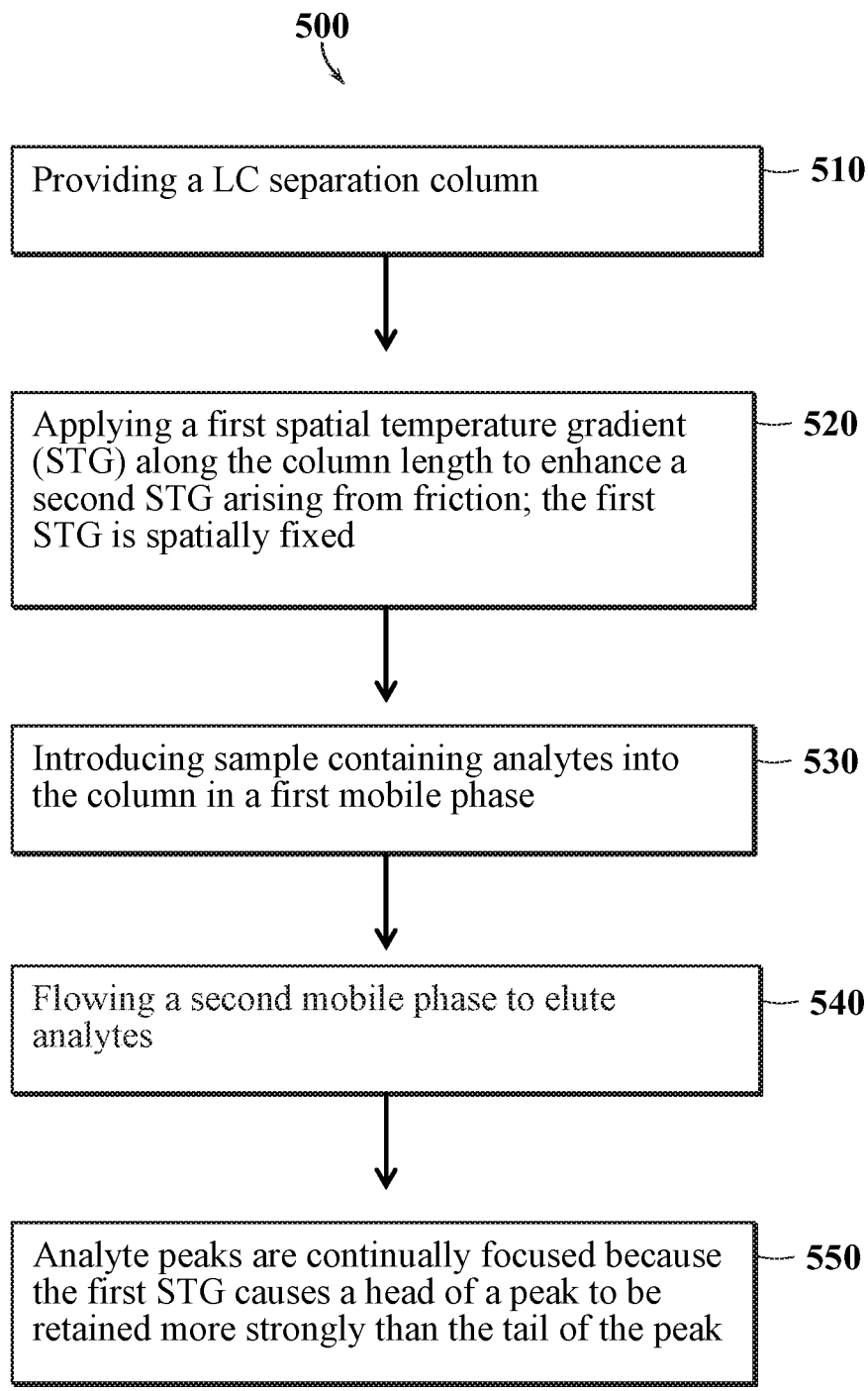
FIG. 5 is a schematic representation of a method for improving resolution of analyte peaks in normal phase liquid chromatography using a spatial temperature gradient applied in a direction that is the same as the spatial temperature gradient arising from frictional heating between mobile and stationary phases.

In another embodiment, the present disclosure provides a method (500; FIG. 5) for improving resolution in a normal phase liquid chromatographic separation by employing an applied spatial temperature gradient that enhances the temperature gradient due to frictional heating. The method includes applying a spatial temperature gradient (first spatial temperature gradient) along at least a portion of the length between an inlet and an outlet of a chromatography column (510, 520). The first temperature gradient is spatially fixed (i.e. does not change with respect to the column length between the column inlet and the column outlet during the separation), and the difference between a highest and a lowest temperature in the gradient is represented by ΔT. In addition, the direction of the applied first spatial temperature gradient is aligned with the direction of a second spatial temperature gradient between the column inlet and the column outlet resulting from friction between the stationary phase and a mobile phase when flowing through the column. In other words, in this embodiment, the applied first spatial temperature gradient is such that it enhances the effect of the second temperature gradient, and the temperature of the stationary phase near the outlet is warmer than that near the inlet (520). Further, different regions of the stationary phase along the column length, when contacted with an analyte, bind the analyte with affinities that depend on the temperatures of the stationary phase in the different regions, because the analytes can have different analyte-stationary phase affinity, and the affinity can depend on temperatures in the different regions. A sample is introduced into the column in a mobile phase (first mobile phase; step 530). Under influence of the first spatial temperature gradient and the first mobile phase, the analytes adsorb at the different regions in accordance with their affinities for the stationary phase at the different regions. Next, a second mobile phase is flowed to elute the analytes (540). As the analytes traverse through the column toward the outlet, the head of a peak is retained more strongly than the tail of the peak. In some cases, the head of the peak is more strongly retained than the tail, due only to the first spatial temperature gradient, e.g., when the magnitude of the second temperature gradient is minimal compared to that of the first temperature gradient. In other cases the difference in retention is due to the combined effect of the first and the second spatial temperature gradients. This stronger retention of the head versus the tail of a peak results in a continuous focusing effect as the analytes migrate toward the column outlet (550). As a result, eluted analyte peaks are narrower compared to chromatography carried out without the applied first spatial temperature gradient.

Focusing of analyte peaks using methods described in the preceding paragraphs is exemplified herein by results obtained for a reverse phase separation of a mixture of alkyl phenones as shown Tables 1 and 2 below. The Tables provide comparisons of separations carried out in the absence or in the presence of an applied spatial temperature gradient. Table 1 shows results of a separation in which a solvent gradient is used to elute the analytes. A custom built microfluidic device 10 cm long and 180 µm wide and packed with 1.8 µm diameter C18 media was used as the separation column. The applied temperature gradient was exponential in nature and the highest and the lowest temperatures of the temperature gradient were about 40° C. and 25° C. respectively. For comparison, an isothermal separation was performed at a constant temperature of 25° C. A solvent gradient obtained by mixing water and acetonitrile (ACN), specifically, 30% to 70% ACN over 15 minutes, was used as the mobile phase. The flow rate was 2.16 µL/min. Comparison of the widths of peaks with and without the spatial temperature gradient showed that applying a spatial temperature gradient resulted in focusing of peaks leading to narrower peaks. For example, the peak width for the analyte valerophenone was observed to be compressed by 7.52% in the presence of the temperature gradient relative to that in the absence of the gradient (Table 1). However, there was no loss, or only a minimal loss in resolution. At the same time it was observed that the retention times for the analyte peaks became shorter in the presence of the spatial thermal gradient. A similar result was obtained when the separation was carried out in an isocratic mode (Table 2). For this separation also, the highest and the lowest temperatures of the applied temperature gradient were 40° C. and 25° C. respectively. The mobile phase used was 50% ACN and 50% water, and the flow rate was 1.44 µL/min. Peaks were observed to be narrower when the spatial temperature gradient was applied compared to those in the absence of the temperature gradient. For example, the peak width for the analyte hexanophenone was observed to be compressed by 36.1% in the presence of the temperature gradient relative to the peak width in the absence of the gradient (Table 2).

TABLE 1

Peak compression due to applied spatial temperature gradient in Liquid Chromatography using a gradient elution

| Analyte | Spatial Temperature Gradient Driven Peak Compression |
|---|---|
| Acetophenone | 9.27% |
| Propiophenone | 9.88% |
| Butyrophenone | 9.23% |
| Valerophenone | 7.52% |
| Hexanophenone | 7.05% |

TABLE 1

Peak compression due to applied spatial temperature gradient in Liquid Chromatography using isocratic elution

| Analyte | Spatial Temperature Gradient Driven Peak Compression |
|---|---|
| Acetophenone | 10.4% |
| Propiophenone | 17.0% |
| Butyrophenone | 22.7% |
| Valerophenone | 30.3% |
| Hexanophenone | 36.1% |

The system and method of the present disclosure can improve the resolution of peaks corresponding to analytes present in a sample by about 5%, 10, 20, 30, 40, 50, 60, 70, 80, 90 or by about 100% compared to a system or method without the use of spatial thermal gradients. These values can be used to define a range, such as about 20% to about 50%. The improved resolution of the peaks can be for the critical-pair separation (a separation where the closest eluting compounds are baseline separated and consequently all other compounds are also separated).

The system and method of the present disclosure can improve the peak fidelity and therefore improve the detection of peaks by the various chromatography detectors that can be used. The signal-to-noise ratio of a peak or peaks separated can be improved by about 5%, 10, 20, 30, 40, 50, 60, 70, 80, 90 or by about 100% compared to a system or method without the use of spatial thermal gradients. These values can be used to define a range, such as about 10% to about 20%. The peak symmetry a peak or peaks separated can be improved by about 5%, 10, 20, 30, 40, 50, 60, 70, 80, 90 or by about 100% compared to a system or method without the use of spatial thermal gradients. These values can be used to define a range, such as about 5% to about 50%. The peak width of a peak can be reduced by about 5%, 10, 15, 20, 25, 30, 35, 40, 45, 50, 55, 60, 65, 70, 75, 80, 85, 90, 95 or by about 100% compared to a system or method without the use of spatial thermal gradients. These values can be used to define a range, such as about 20% to about 40%. The peak capacity of a column can be increased by about 5%, 10, 15, 20, 25, 30, 35, 40, 45, 50, 55, 60, 65, 70, 75, 80, 85, 90, 95 or by about 100% compared to a system or method without the use of spatial thermal gradients. These values can be used to define a range, such as about 20% to about 40%.

The difference between the highest and the lowest temperature in an applied temperature gradient depends on the chromatography techniques and nature of the separation. The temperature difference for any one gradient can be about 5° C., 10, 15, 20, 25, 30, 35, 40, 40, 50, 55, 60, 65, 70, 75, 80, 85, 90, 95 or about 100° C. These values can be used to define a range, such as about 20° C. to about 50° C.

A thermal gradient may also be used in a trap column. A trap column is typically used in liquid chromatography to retain and concentrate analytes present in a sample. A trap column enables loading at a higher flow rate, which is useful when the analyte sample is dilute and large volumes of the sample have to be loaded. It is also useful in retention of the analytes present in the sample. These objectives could, in theory, be achieved in the separation column. However, a separation column is usually long and packed with fine particles, which results in a large backpressure. Large backpressure presents an obstacle for rapidly loading a large sample volume at an elevated flow rate. Therefore, shorter and wider inner diameter (I.D.) trap columns are used in conjunction with fast flow rate for sample trapping. Trapped analytes are then eluted onto primary analytical column for performing the separation. Short (and wider) trap column packed with larger diameter particles (e.g. 5 µM) permit rapid sample loads.

However, for trapping to be effective, the sample components should be well retained and focused on the trap column. This is ensured by loading the sample under conditions promoting retention, e.g. selecting a solvent of week elution strength for dissolving samples, or by choosing a highly retentive stationary phase, or by modulating the temperature of the trap column. Regardless, as a large sample volume is loaded, even retained components move slowly forward within the trap column, forming wider zone in which analytes present in the sample are distributed. Eventually, in an undesirable outcome, some weakly retained components may break through the trap column.

Figure 2A:
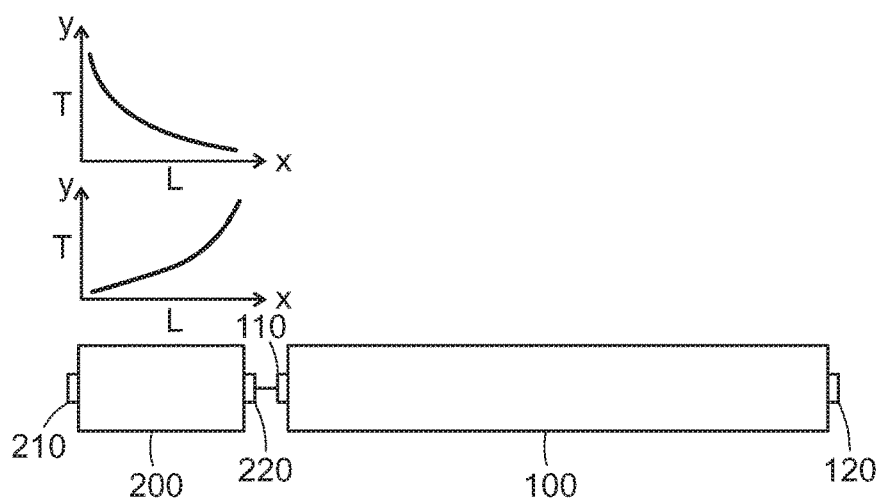
FIG. 2A is a schematic diagram of a trap column situated upstream of a liquid chromatography column in a liquid chromatography apparatus. Above the trap column are shown graphs for exemplary spatial temperature gradients along the length of the trap column with the temperature increasing (upper graph) or decreasing (lower graph) in the direction of the column inlet to the column outlet.
Figure 2B:
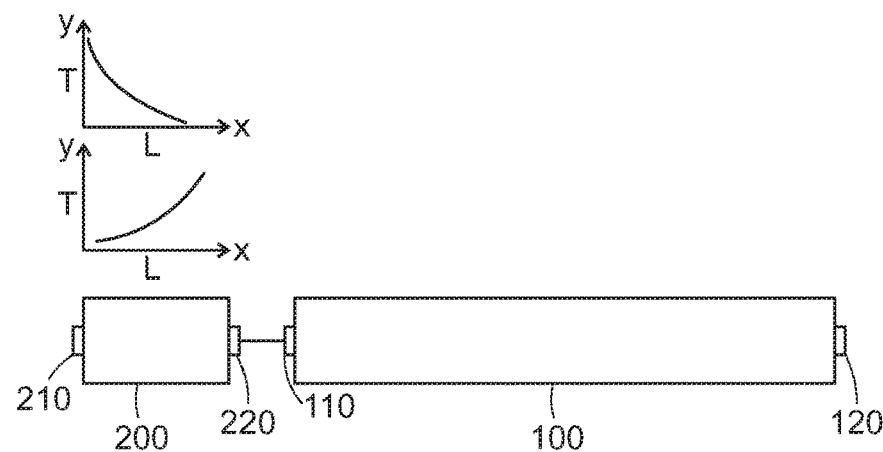
FIG. 2B is a schematic diagram showing a trap column with a spatial temperature gradient situated upstream of a liquid chromatography column as in FIG. 2A, and additionally showing graphs for exemplary spatial temperature gradients along the length the chromatography column. The temperature is shown decreasing (upper graph) or increasing (lower graph), respectively, in the direction of the column inlet to the column outlet.
Figure 2B:
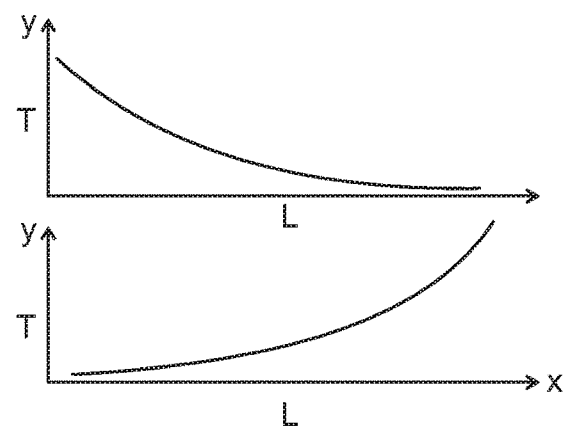
Figure 2C:
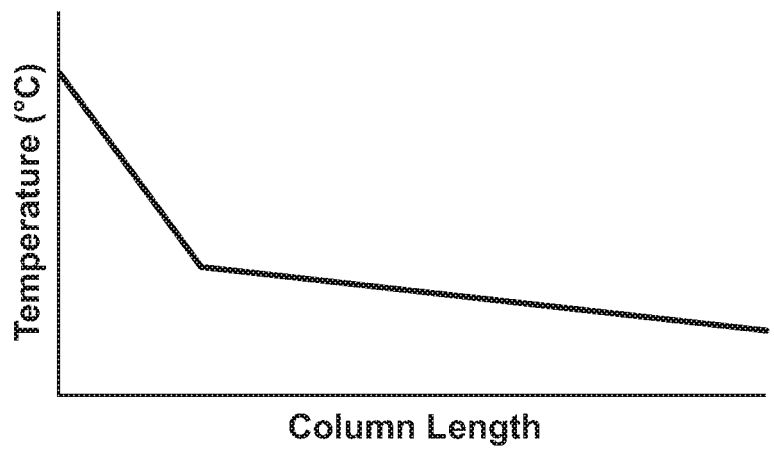
FIG. 2C is a schematic diagram showing three exemplary spatial thermal gradients.
Figure 2C:
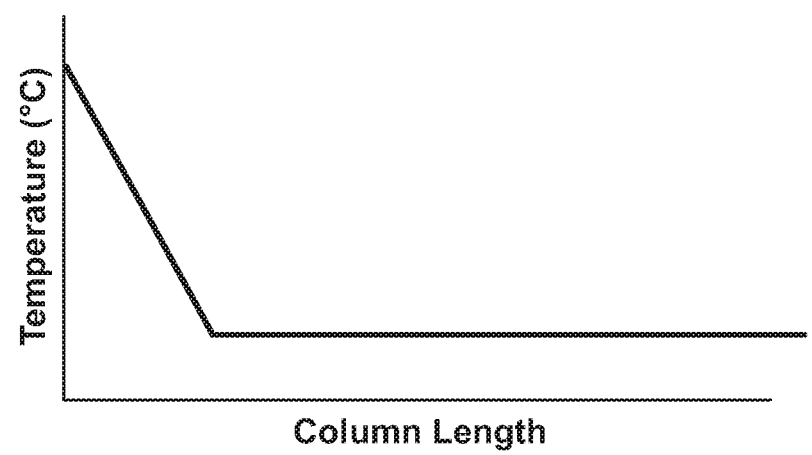
Figure 2C:
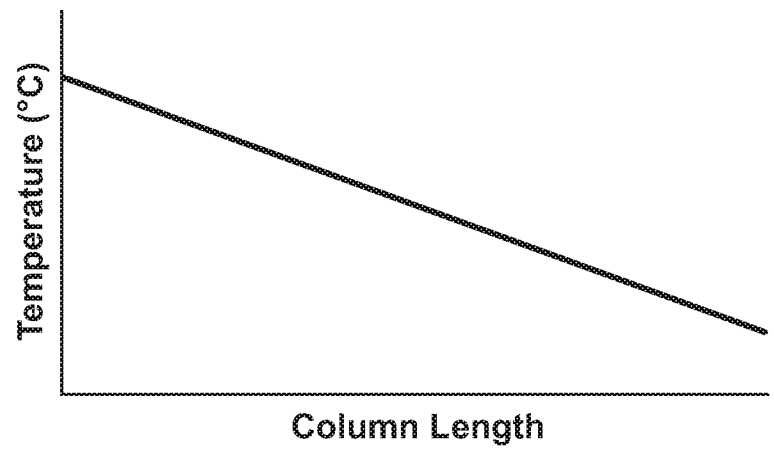

To prevent break through one may apply a temperature gradient on the trap column. A thermal gradient in a trap column (trap) may also be used in conjunction with another thermal gradient applied to the separation column. For example, the temperature gradient of the separation column may be such that the highest temperature of the separation column temperature gradient is lower than the lowest temperature of the trap column temperature gradient. FIG. 2A illustrates a trap column (200) situated upstream of the chromatography column (100) in a liquid chromatography apparatus. This configuration, is suitable for eluting the analytes. In an alternative configuration the trap column is not connected to the separation column while the sample is being loaded onto the trap column. Above the trap column (200) is shown graphs for exemplary spatial temperature gradients established along the length of the trap column (200). In the graph, the X-axis represents distance (L) from the trap column inlet (210). Temperature (T) of the trap column (200) at various distances from the trap column inlet (210) is shown along the Y-axis. FIG. 2B shows a trap column (200) with a spatial temperature gradient situated upstream of a liquid chromatography column (100), and further shows graphs for exemplary spatial temperature gradients along the length the chromatography column. In the graphs, the temperature is shown decreasing (upper graph) or increasing (lower graph), respectively, in the direction of the column inlet (110) to the column outlet (220). Distance (L) from the trap column inlet (210) or the chromatography column inlet (110) is plotted along the X-axis, and temperature (T) of the trap column (200) or the chromatography column (100) at various distances from the respective inlets (210, 110) is plotted along the Y-axis. FIG. 2C illustrates three additional exemplary spatial thermal gradients. All three gradients are linear. One gradient (top) is discontinuous, being steeper near the column inlet compared to that near the outlet. A second gradient (middle) is also discontinuous, but with only the part near the column inlet representing temperature change, the remaining portion representing an isothermal condition. A third gradient (bottom) is a linear continuous gradient.

Figure 6:
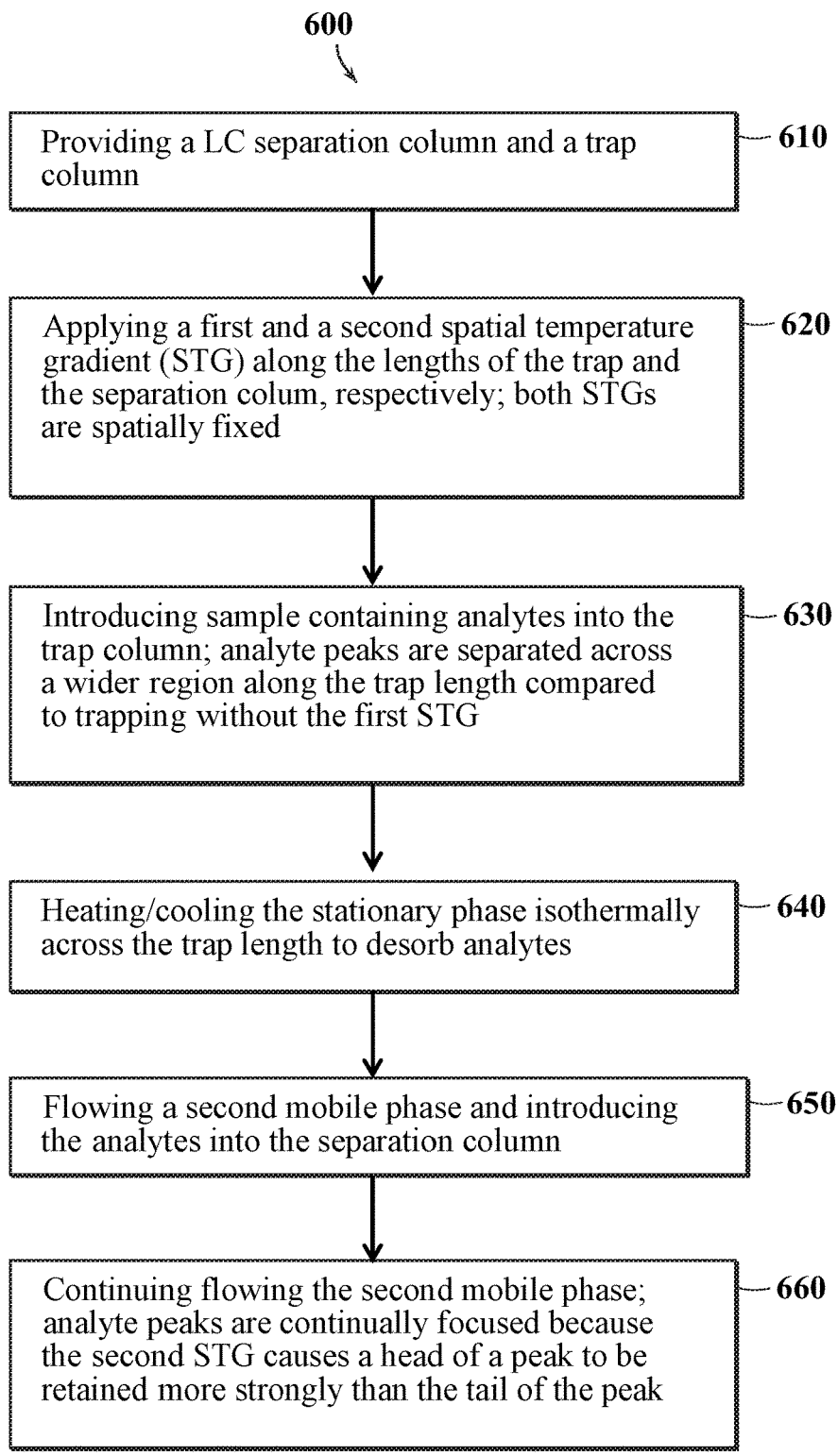
FIG. 6 is a schematic representation of a method for improving resolution of analyte peaks in liquid chromatography using a trap column placed upstream of a separation column, and a spatial temperature gradient applied to each.

Accordingly, in one embodiment, the present disclosure provides a method (600) employing a trap column to which a temperature gradient is applied (FIG. 6). The method is used for improving resolution of peaks corresponding to analytes present in a sample. The trap column is disposed upstream of a separation column (610). The trap column is packed with a first stationary phase along a trap length between a trap inlet and a trap outlet. Likewise, the separation column is packed with a second stationary phase along a column length between a column inlet and a column outlet. A spatial temperature gradient (first spatial temperature gradient) is applied along at least a portion of the trap length, and another spatial temperature gradient (second spatial temperature gradient) is applied along at least a portion of the column length (620). Both, the first and the second temperature gradients are spatially fixed. The difference between a highest and a lowest temperature in the first temperature gradient is represented by $\Delta T_1$, and the difference between a highest and a lowest temperature in the second temperature gradient is represented by $\Delta T_2$. Further, different regions of the first stationary phase along the trap length and different regions of the second stationary phase along the column length, when contacted with an analyte, bind the analyte with affinities that depend on the temperatures of the first stationary phase in the different regions of the trap length and the temperatures of the second stationary phase in the different regions of the column length, respectively. The sample is introduced into the trap column in a first mobile phase. Under influence of the first spatial temperature gradient and the first mobile phase, the analytes adsorb at the different regions along the trap length in accordance with their affinities for the first stationary phase at the different regions. As a result analyte peaks are separated across a wider region along the trap length as compared to trapping without the first spatial temperature gradient (630). Next, the first stationary phase is heated/cooled isothermally across the trap length to a temperature sufficient to desorb the analytes (640). The analytes are introduced into the separation column by flowing the first mobile phase or a second mobile phase through the column (650). Once introduced to the separation column, under influence of the second temperature gradient and the first or second mobile phase used for introducing the analytes into the separation column, the desorbed analytes adsorb at different regions along the column length in accordance with their affinities for the second stationary phase at the different regions. In addition, a condition is created in the column such that a head of a peak corresponding to an analyte is retained more strongly than a tail of the peak. The flow of the second mobile phase is continued to elute the plurality of analytes (660). As the analyte peak migrates through the separation column, the head of the peak is continually retained more strongly than the tail of the peak. This results in repeated focusing of the peak leading eventually to elution of the analyte in the form of a narrow peak compared to chromatography lacking the first and the second temperature gradients.

In order to be effective in concentrating analytes, the retentivity of a trap column should be lower than that of the separation column. Under this condition, the relatively wide trapped zone undergoes focusing as the analytes exit the trap column and are concentrated at the inlet of the separation column. The need for a trap column to be less retentive runs counter to the desired feature that the trap column be highly retentive to capture analytes effectively. To maintain high retentivity so as to prevent break through of analytes into the separation column, while also preserving the ability to desorb analytes for introducing them to the separation column, it may be advantageous to use a stationary phase modified with a temperature-sensitive polymer/copolymer in the trap column. In such stationary phases, retentivity is adjusted by altering the temperature. For many temperature-sensitive polymers or temperature-sensitive copolymers, retentivity increases at elevated temperatures (opposite to that observed in conventional reversed-phase LC). A temperature gradient suitable for optimally retaining analytes may be applied to the trap column. Once the sample is loaded and adsorbed in the trap column under the influence of a suitable temperature gradient, the trap column may be heated or cooled to desorb the analytes, thereby allowing the analytes to enter the separation column.

Figure 7:
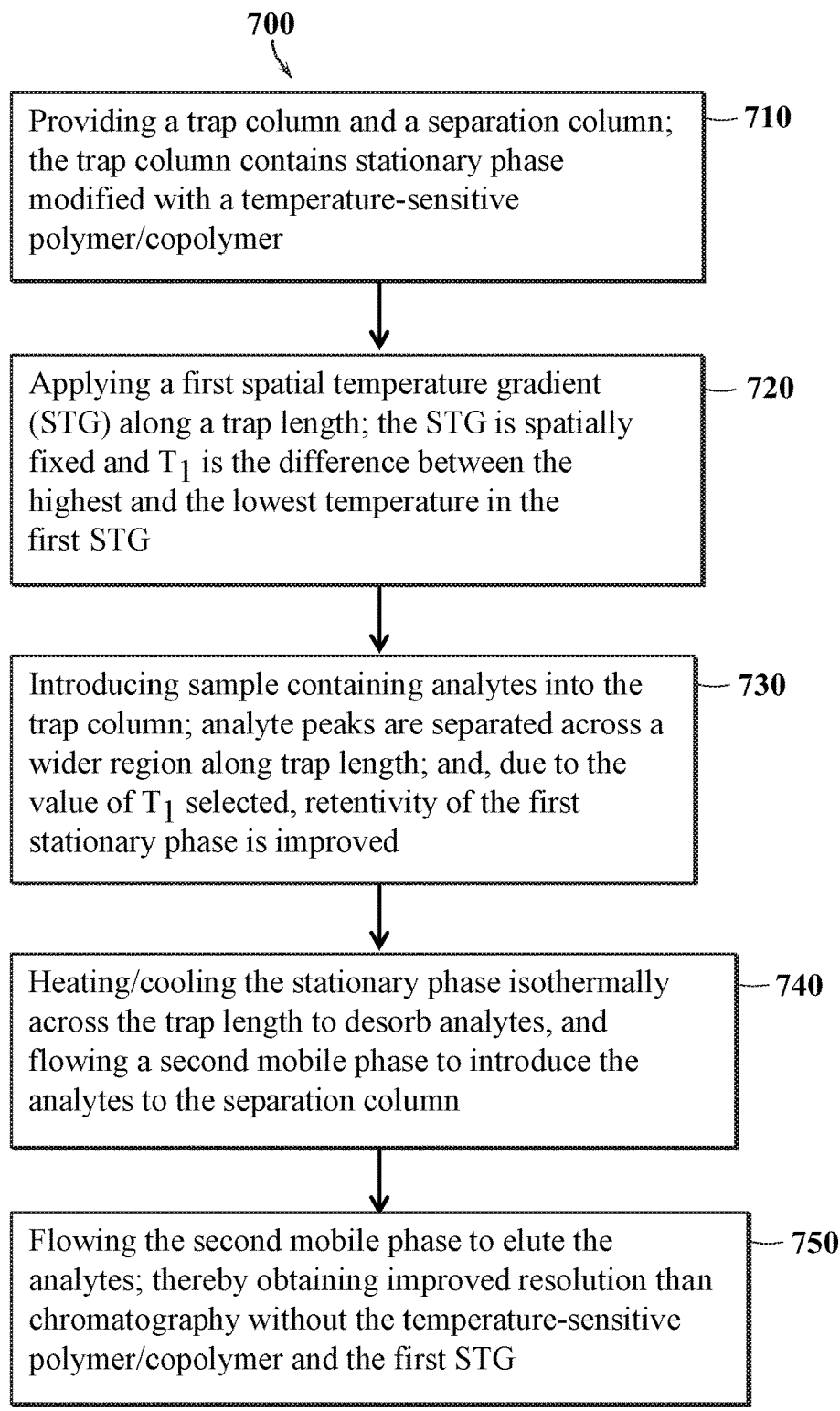
FIG. 7 is a schematic representation of a method for improving resolution of analyte peaks in liquid chromatography using a trap column placed upstream of a separation column. The trap column is packed with a stationary phase modified with a temperature-sensitive polymer/copolymer. A spatial temperature gradient is applied along the length of the trap column.

Accordingly, in one embodiment, a method (700; FIG. 7) employing a trap column packed with a stationary phase modified with a temperature-sensitive polymer/copolymer is provided for improving resolution of analyte peaks corresponding to analytes present in a sample. The stationary phase (first stationary phase) modified with a temperature-sensitive polymer/copolymer is packed along a trap length between a trap inlet and a trap outlet (710). Downstream from the trapping column is a separation column packed with a second stationary phase along a column length between a column inlet and a column outlet. A spatial temperature gradient (first spatial temperature gradient) is applied along at least a portion of the trap length (720). The first temperature gradient is spatially fixed. The difference between the highest and the lowest temperature in the gradient, $\Delta T_1$, is selected so as to allow a desired level of retentivity to be achieved by the first stationary phase relative to the separation column. Under the influence of the first temperature gradient, different regions of the first stationary phase along the trap length, when contacted with an analyte, bind the analyte with affinities that depend on the temperatures of the stationary phase in the different regions, because the analytes can have different analyte-stationary phase affinity, and the affinity can depend on temperatures in the different regions. The sample is then introduced into the trap column in a mobile phase (first mobile phase; step 730). Under influence of the first spatial temperature gradient and the first mobile phase, the analytes adsorb at different regions along the trap length in accordance with their affinities for the first stationary phase at the different regions. This results in greater separation among the plurality of analytes adsorbed along the trap length than achievable in the absence of the first spatial temperature gradient. Further, the retentivity of the first stationary phase is improved. The first stationary phase is heated/cooled isothermally across the trap length to a temperature sufficient to desorb the plurality of analytes (740). A second mobile phase is flowed to introduce the analytes to the separation column. The second mobile phase is next flowed to elute the analytes introduced into the separation column (750). Improved resolution of the peaks corresponding to the analytes, compared to chromatography absent the temperature-sensitive polymer/copolymer modified first stationary phase and the first spatial temperature gradient is obtained.

In one embodiment, the method above employing a trapping column packed with a temperature sensitive gradient further includes applying a second temperature gradient in the separation column causing different regions of the separation column to be at different temperatures. The second temperature gradient is applied along at least a portion of the column length between a column inlet and a column outlet prior to introducing the analytes desorbed from the trapping column into the separation column. The second temperature gradient also is spatially fixed. The difference between a highest and a lowest temperature in the second spatial temperature gradient is represented by $\Delta T_2$. The different regions of the stationary phase along the column length, when contacted with an analyte, can bind to the analyte with affinities that depend on the temperatures of the stationary phase in the different regions because of the different analyte-stationary phase affinity, and the affinity depends on temperatures in the different regions. As the second mobile phase is flowed, under influence of the second spatial temperature gradient and the second mobile phase, the analytes adsorb at different regions along the column length in accordance with their affinities for the second stationary phase at the different regions. In addition, a condition is created in the column such that a head of a peak corresponding to an analyte among the plurality of analytes is retained more strongly than a tail of the peak. The differential retention between the head and the tail of a peak is repeated as the analyte migrates through the separation column, thereby resulting in repeated focusing of the peak, and eventually elution of the analyte in the form of a narrow peak. Thus, this embodiment results in improved resolution as well as narrow peaks.

It is within the contemplation of the present invention that the trap column and the separation column may both be packed with a temperature-sensitive polymer or a temperature-sensitive copolymer. Alternatively, only the separation column, not the trap column may be packed with a temperature-sensitive polymer or a temperature-sensitive copolymer.

In the embodiments above, the spatial temperature gradient, in addition to being fixed spatially, may also be fixed temporally. That is, the spatial temperature gradient once applied, remains unchanged with respect to the column length along which the temperature gradient is applied, and also remains unchanged throughout the chromatography. In some embodiments, the highest and the lowest temperatures of a spatial temperature gradient may both be either raised or lowered during chromatography without changing $\Delta T_2$. For example, if the highest and the lowest temperatures of an applied spatial temperature gradient were 50° C. and 30° C., respectively (i.e., $\Delta T=20°$ C.), they could both be raised by 5° C. to reach 55° C. and 35° C. as the new highest and the lowest temperatures, respectively. Also, in the embodiments above, the first mobile phase, which is used to introduce the sample into the chromatography column or into the trap column, may be the same as the second mobile phase used to elute the analytes from the separation column (or used also to introduce analytes from the trap column into the separation column). Alternatively, the first and the second mobile phases could be different from each other. For example, the first mobile phase may be a single solvent (e.g. water), and the second mobile phase may be a different solvent or may include a mixture of solvents. Alternatively, the first mobile phase may include a mixture of solvents. The mixture of solvents present in the first and/or the second mobile phase may include at least two solvents mixed in a ratio that changes during the chromatography according to a gradient. For example, in one embodiment, the composition of the second mobile phase used to elute the analytes, comprises a mixture of 90% acetonitrile and 10% water, and changes during the separation to an end composition of 10% acetonitrile and 90% water. Alternatively, the mixture of solvents may have a fixed composition.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments, such as a spatial thermal gradient, the direction of a spatial thermal gradient, reverse versus normal phase chromatography, and the use of a trap column, can exist in various combinations and permutations, even if such combinations or permutations are not made express herein, without departing from the spirit and scope of the technology.

What is claimed is:

1. A method for focusing analyte peaks corresponding to a plurality of analytes present in a sample, the method comprising the steps of:
   (a) providing a liquid chromatography apparatus comprising a column packed with a stationary phase along a packed column length between a column inlet and a column outlet;
   (b) applying a spatial temperature gradient along at least a portion of the packed column length, wherein the temperature gradient is spatially fixed and does not change with respect to the packed column length between the column inlet and the column outlet during a separation, wherein $\Delta T$ represents the difference between a highest and a lowest temperature in the applied spatial temperature gradient, and wherein different regions of the stationary phase along the packed column length, when contacted with an analyte, have different analyte-stationary phase affinity, and the affinity depends on temperatures in the different regions;
   (c) introducing the sample into the column in a first mobile phase, wherein under influence of the applied spatial temperature gradient and the first mobile phase, the plurality of analytes adsorb at the different regions in accordance with their affinities for the stationary phase at the different regions, and a condition is created in the column such that a head of a peak corresponding to an analyte among the plurality of analytes is retained more strongly than a tail of the peak; and,
   (d) continuing flowing the first mobile phase of flowing a second mobile phase to elure the plurality of analytes, thereby repeatedly focusing the peaks corresponding to the plurality of analytes compared to chromatography absent the spatial temperature gradient.

2. The method of claim 1, wherein composition of the first mobile phase and the second mobile phase are the same.

3. The method of claim 1, wherein in step (d) flow rate of the first or the second mobile phase is higher relative to flow rate used for introducing the plurality of analytes into the column.

4. The method of claim 1, wherein the spatial temperature gradient is temporally fixed.

5. The method of claim 1, wherein the highest temperature and the lowest temperature of the spatial temperature gradient are raised or lowered during chromatography without changing the ΔT.

6. The method of claim 1, wherein composition of the first mobile phase and the second mobile phase are different.

7. The method of claim 6, wherein the first and/or the second mobile phase comprises at least two solvents mixed in a fixed ratio.

8. The method of claim 6, wherein the first and/or second mobile phase comprises at least two solvents mixed in a ratio that changes according to a gradient.

9. A method for focusing analyte peaks corresponding to a plurality of analytes present in a sample in a liquid chromatography separation, the method comprising the steps of:
   (a) providing a liquid chromatography apparatus comprising a column packed with a stationary phase along a packed column length between a column inlet and a column outlet;
   (b) applying a first spatial temperature gradient along at least a portion of the packed column length, wherein the temperature gradient is spatially fixed and does not change with respect to the packed column length between the column inlet and the column outlet during a separation, wherein ΔT represents the difference between a highest and lowest temperature gradient, wherein direction of the applied first spatial temperature gradient is opposite to direction of a second spatial temperature gradient between the column inlet and the column outlet resulting from friction between the stationary phase and a mobile phase when flowing through the column; and wherein different regions of the stationary phase along the packed column length, when contacted with an analyte, have different analyte-stationary phase affinity, and the affinity depends on temperatures in the different regions;
   (c) introducing the sample into the column in a first mobile phase, wherein under influence of the first spatial temperature gradient and the first mobile phase, the plurality of analytes adsorb at the different regions in accordance with their affinities for the stationary phase at the different regions; and,
   (d) continuing flowing the first mobile phase or flowing a second mobile phase to elute the plurality of analytes, thereby repeatedly focusing the peaks corresponding to the plurality of analytes compared to chromatography absent the first spatial temperature gradient.

10. The method of claim 9, wherein composition of the first mobile phase and the second mobile phase are different.

11. The method of claim 9, wherein the liquid chromatographic separation is a reverse phase separation.

12. The method of claim 9, wherein the liquid chromatography separation is a normal phase separation.

13. The method of claim 9, wherein in step (d), flow rate of the first or the second mobile phase is higher relative to flow rate used for introducing the plurality of analytes into the column.

14. The method of claim 9, wherein the first spatial temperature gradient is temporally fixed.

15. The method of claim 9, wherein the highest temperature and the lowest temperature of the first spatial temperature gradient are raised during chromatography without changing the ΔT.

16. The method of claim 9, wherein composition of the first mobile phase and the second mobile phase are different.

17. The method of claim 16, wherein the first and/or second mobile phase comprises at least two solvents mixed in a fixed ratio.

18. The method of claim 16, wherein the first and/or second mobile phase comprises at least two solvents mixed in a ratio that changes according to a gradient.

19. A method of improving resolution of analyte peaks corresponding to a plurality of analytes present in a sample, the method comprising the steps of:
   (a) providing a liquid chromatography apparatus comprising a trap column, and a separation column downstream from the trap column; wherein the trap column is packed with a first stationary phase along a trap length between a trap inlet and a trap outlet; and wherein the separation column is packed with a second stationary phase along a column length between a column inlet and a column outlet;
   (b) applying a first spatial temperature gradient along at least a portion of the trap length, and applying a second spatial temperature gradient along at least a portion of the column length, wherein each of the first and the second temperature gradients is spatially fixed, wherein $\Delta T_1$ represents the difference between a highest and a lowest temperature in the first temperature gradient, and $\Delta T_2$ represents the difference between a highest and a lowest temperature in the second temperature gradient, wherein different regions of the first stationary phase along the trap length, and different regions of the second stationary phase along the column length, when contacted with an analyte, have different analyte-stationary phase affinity, and the affinity depends on temperatures in the different regions of the trap length and temperatures in the different regions of the column length, respectively;
   (c) introducing the sample into the trap column in a first mobile phase, wherein under influence of the first spatial temperature gradient and the first mobile phase, the plurality of analytes adsorb at the different regions along the trap length in accordance with their affinities for the first stationary phase at the different regions; thereby achieving greater separation among the plurality of analytes adsorbed along the trap length than achievable in the absence of the first spatial temperature gradient;
   (d) desorbing the plurality of analytes from the trap column by heating/cooling the first stationary phase isothermally across the trap length while continuing flowing the first mobile, or flowing a second mobile phase, thereby, introducing the desorbed plurality of analytes into the separation column, wherein under influence of the second temperature gradient and first or the second mobile phase, the plurality of analytes adsorb at different regions along the column length in accordance with their affinities for the second stationary phase at the different regions; and a condition is created in the column such that a head of a peak corresponding to an analyte among the plurality of analytes is retained more strongly than a tail of the peak; and,
   (e) flowing, or continuing flowing the second mobile phase to elute the plurality of analytes, thereby repeatedly focusing the peaks corresponding to the plurality of analytes compared to chromatography absent the first and the second temperature gradients.

20. The method of claim 19, wherein, the desorbing of the plurality of analytes from the trap column comprises heating/cooling the first stationary phase isothermally across the trap length to a temperature sufficient to desorb the plurality of analytes.

\* \* \* \* \*